(12) United States Patent
Ye et al.

(10) Patent No.: US 12,248,170 B2
(45) Date of Patent: Mar. 11, 2025

(54) VEHICLE WINDOW ASSEMBLY AND VEHICLE

(71) Applicant: FUYAO GLASS INDUSTRY GROUP CO., LTD., Fujian (CN)

(72) Inventors: Jiarong Ye, Fujian (CN); Shengye Lin, Fujian (CN); Zuoshui Mao, Fujian (CN); Limin Cao, Fujian (CN)

(73) Assignee: FUYAO GLASS INDUSTRY GROUP CO., LTD., Fujian (CN)

( * ) Notice: Subject to any disclaimer, the term of this patent is extended or adjusted under 35 U.S.C. 154(b) by 0 days.

(21) Appl. No.: 18/632,590

(22) Filed: Apr. 11, 2024

(65) Prior Publication Data

US 2024/0255692 A1    Aug. 1, 2024

Related U.S. Application Data

(63) Continuation of application No. PCT/CN2021/124224, filed on Oct. 15, 2021.

(51) Int. Cl.
*G02B 6/00* (2006.01)
*B60J 1/00* (2006.01)
(Continued)

(52) U.S. Cl.
CPC ............ *G02B 6/0095* (2013.01); *B60J 1/001* (2013.01); *G02B 6/0088* (2013.01); *B60Q 3/208* (2017.02)

(58) Field of Classification Search
CPC ........ B60Q 3/208; B60J 1/001; G02B 6/0095; G02B 6/0088
See application file for complete search history.

(56) References Cited

U.S. PATENT DOCUMENTS

| 2015/0273092 A1* | 10/2015 | Holub | B60Q 3/68 250/492.1 |
| 2017/0160456 A1* | 6/2017 | Shani | G02B 6/0018 |

(Continued)

FOREIGN PATENT DOCUMENTS

| CN | 104114392 A | 10/2014 |
| CN | 107471978 A | 12/2017 |

(Continued)

OTHER PUBLICATIONS

International Search Report dated May 26, 2022 issued in PCT/CN2021/124224.

(Continued)

*Primary Examiner* — Gerald J Sufleta, II
(74) *Attorney, Agent, or Firm* — Scully, Scott, Murphy & Presser, P.C.

(57) ABSTRACT

A vehicle window assembly and a vehicle are provided. The vehicle window assembly includes a vehicle window glass and a light-guiding assembly. The vehicle window glass includes a first transparent plate, an intermediate layer, and a second transparent plate, and the second transparent plate defines a through-hole. The light-guiding assembly includes a light-guiding member and a fixing member. The light-guiding member is at least partially disposed in the through-hole, and a light-outputting surface of the light-guiding member is disposed facing towards an inner sidewall of the through-hole. The fixing member is disposed on a surface of the second transparent plate facing away from the first transparent plate, and the fixing member and the second transparent plate define an accommodating space configured to accommodate a light source. A light-emitting surface of the light source is disposed facing towards a light-inputting surface of the light-guiding member.

20 Claims, 10 Drawing Sheets

(51) Int. Cl.
*F21V 8/00* (2006.01)
*B60Q 3/208* (2017.01)

(56) References Cited

U.S. PATENT DOCUMENTS

2019/0106055 A1* 4/2019 Yoon .................. B60Q 3/85
2021/0170724 A1* 6/2021 Hennion ........... B32B 17/10541

FOREIGN PATENT DOCUMENTS

| | | |
|---|---|---|
| CN | 207942977 U | 10/2018 |
| CN | 108990414 A | 12/2018 |
| CN | 208646560 U | 3/2019 |
| CN | 211942909 U | 11/2020 |
| CN | 112721798 A | 4/2021 |
| EP | 2528777 B1 | 12/2015 |
| FR | 2997648 A1 | 5/2014 |
| FR | 3023214 A1 | 1/2016 |
| WO | 2019105855 A1 | 6/2019 |

OTHER PUBLICATIONS

Extended European search report dated Aug. 20, 2024 received in European Patent Application No. 21960328.9.

* cited by examiner

VEHICLE WINDOW ASSEMBLY AND VEHICLE

CROSS-REFERENCE TO RELATED DISCLOSURE (S)

The application is a continuation of International Application No. PCT/CN2021/124224, filed Oct. 15, 2021, the entire disclosures of which is incorporated herein by reference.

TECHNICAL FIELD

The present disclosure relates to the technical field of vehicle accessories, and in particular to a vehicle window assembly and a vehicle.

BACKGROUND

Vehicles have always been one of the most important means of transportation for mankind. Currently, a vehicle window glass on a vehicle is perforated, and multiple light-emitting diodes (LEDS) can be integrated inside the vehicle window glass, so as to achieve different functions.

In the related art, strength of the vehicle window glass at the perforated area is not reinforced in terms of structure, for example, the light-emitting diode is directly disposed in the perforated area, resulting in the strength of the vehicle window glass at the perforated area being weaker than that of the vehicle window glass at other non-perforated areas, which may affect the safety of vehicle driving.

SUMMARY

In a first aspect, a vehicle window assembly is provided in the present disclosure. The vehicle window assembly includes a vehicle window glass and a light-guiding assembly. The vehicle window glass includes a first transparent plate, an intermediate layer, and a second transparent plate that are stacked successively, the first transparent plate is connected to the second transparent plate via the intermediate layer, and the second transparent plate defines a through-hole. The light-guiding assembly includes a light-guiding member and a fixing member. The light-guiding member is at least partially disposed in the through-hole, and a light-outputting surface of the light-guiding member is disposed facing towards an inner sidewall of the through-hole. The fixing member is disposed on a surface of the second transparent plate facing away from the first transparent plate, and the fixing member and the second transparent plate define an accommodating space configured to accommodate a light source. A light-emitting surface of the light source is disposed facing towards a light-inputting surface of the light-guiding member. The vehicle window glass further includes a light-sensitive member, the light-sensitive member is disposed corresponding to the light-outputting surface of the light-guiding member, to make light emitted by the light source incident to the light-sensitive member via the light-guiding member, and the light-sensitive member is configured to transmit the light into a vehicle.

In a second aspect, a vehicle is further provided in the present disclosure. The vehicle includes a vehicle window assembly and a vehicle frame, where the vehicle window assembly is mounted on the vehicle frame. The vehicle window assembly includes a vehicle window glass and a light-guiding assembly. The vehicle window glass includes a first transparent plate, an intermediate layer, and a second transparent plate that are stacked successively, the first transparent plate is connected to the second transparent plate via the intermediate layer, and the second transparent plate defines a through-hole. The light-guiding assembly includes a light-guiding member and a fixing member. The light-guiding member is at least partially disposed in the through-hole, and a light-outputting surface of the light-guiding member is disposed facing towards an inner sidewall of the through-hole. The fixing member is disposed on a surface of the second transparent plate facing away from the first transparent plate, and the fixing member and the second transparent plate define an accommodating space configured to accommodate a light source. A light-emitting surface of the light source is disposed facing towards a light-inputting surface of the light-guiding member. The vehicle window glass further includes a light-sensitive member, the light-sensitive member is disposed corresponding to the light-outputting surface of the light-guiding member, to make light emitted by the light source incident to the light-sensitive member via the light-guiding member, and the light-sensitive member is configured to transmit the light into a vehicle.

BRIEF DESCRIPTION OF THE DRAWINGS

In order to describe more clearly technical solutions of embodiments of the present disclosure, the following will give a brief introduction to accompanying drawings used for describing embodiments. Apparently, the accompanying drawings described below only are some embodiments of the present disclosure. Based on these drawings, those of ordinary skill in the art can also obtain other drawings without creative effort.

Reference signs: vehicle window assembly—1, vehicle window glass—11, first transparent plate—111, intermediate layer—112, second transparent plate—113, light-sensitive member—114, through-hole—115, reflective layer—116, light-guiding assembly—12, light-guiding member—121, light-inputting surface—1211, light-outputting surface—1212, optical sub-member—1213, supporting portion—1214, fixing member—122, base plate—1221, housing—1222, reinforcing rib—1223, snap—fit member—1224, accommodating space—123, vehicle—2, light source—21, light-emitting surface—211, vehicle frame—22, gap 117; reflective substance 118.

DETAILED DESCRIPTION

The following will describe technical solutions of embodiments of the present disclosure clearly and completely with reference to accompanying drawings of embodiments of the present disclosure. Apparently, embodiments described herein are merely some embodiments, rather than all embodiments, of the present disclosure. Based on embodiments of the present disclosure, all other embodiments obtained by those of ordinary skill in the art without creative effort shall fall within the protection scope of the present disclosure.

Figure 1:
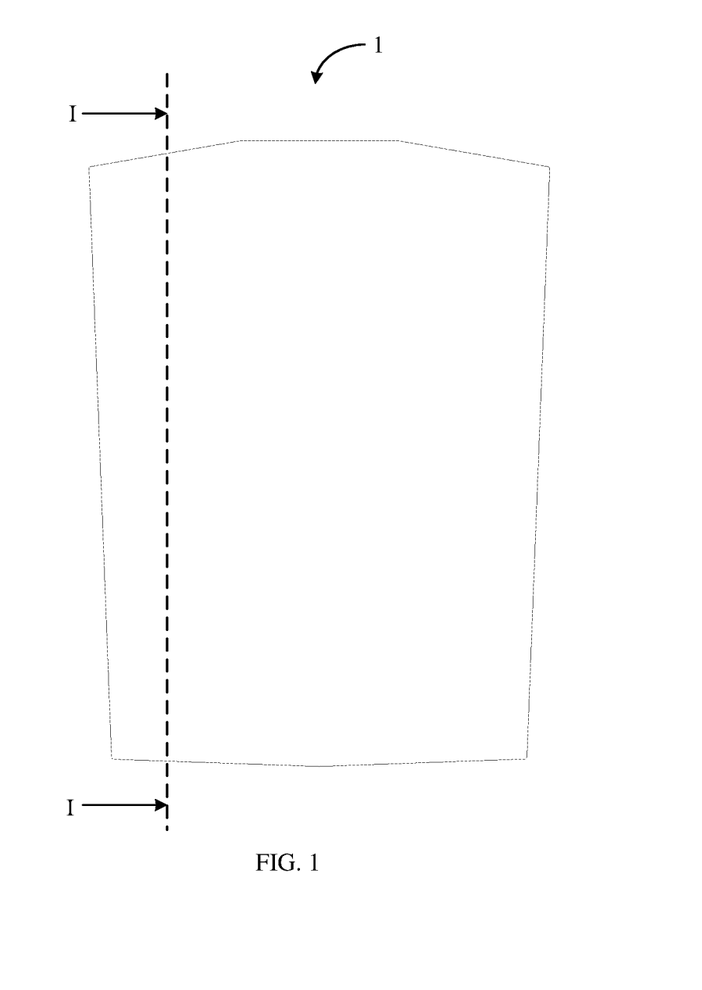
FIG. 1 is a schematic top view of a vehicle window assembly provided in an implementation of the present disclosure.
Figure 2:
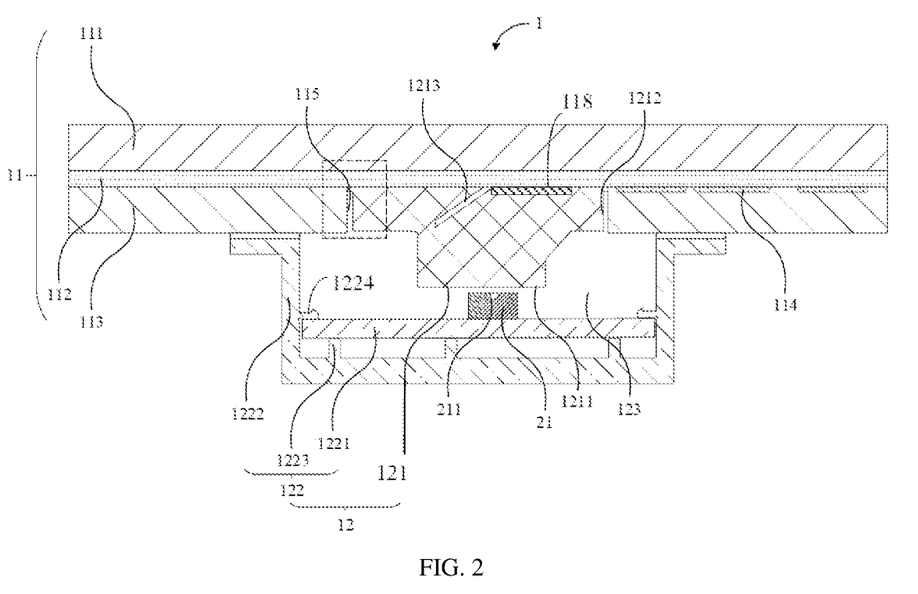
FIG. 2 is a schematic cross-sectional view taken along a line I-I in FIG. 1.

A vehicle window assembly 1 is provided in the present disclosure. Reference can be made to FIG. 1 and FIG. 2 together, where FIG. 1 is a schematic top view of a vehicle window assembly provided in an embodiment of the present disclosure, and FIG. 2 is a schematic cross-sectional view taken along a line I-I in FIG. 1. The vehicle window assembly 1 includes a vehicle window glass 11 and a light-guiding assembly 12 12. The vehicle window glass 11 includes a first transparent plate 111, an intermediate layer 112, and a second transparent plate 113 that are stacked successively. The first transparent plate 111 is connected to the second transparent plate 113 via the intermediate layer 112. The second transparent plate 113 defines a through-hole 115. The light-guiding assembly 12 includes a light-guiding member 121 and a fixing member 122. The light-guiding member 121 is at least partially disposed in the through-hole 115, the light-guiding member 121 at least partially abuts against the intermediate layer 112 and the second transparent plate 113. A light-outputting surface 1212 of the light-guiding member 121 is disposed facing towards an inner sidewall of the through-hole 115. The fixing member 122 is disposed on a surface of the second transparent plate 113 facing away from the first transparent plate 111. The fixing member 122 and the second transparent plate 113 define an accommodating space 123 configured to accommodate a light source 21. A light-emitting surface 211 of the light source 21 is disposed facing towards a light-inputting surface 1211 of the light-guiding member 121. The vehicle window glass 11 further includes a light-sensitive member 114. The light-sensitive member 114 is disposed corresponding to the light-outputting surface 1212 of the light-guiding member 121, to make light emitted by the light source 21 incident to the light-sensitive member 114 via the light-guiding member 121. The light-sensitive member 114 is configured to transmit the light into a vehicle.

It may be noted that the vehicle window glass 11 is laminated glass. When the vehicle window glass 11 is mounted on the vehicle, one side of the first transparent plate 111 facing away from the second transparent plate 113 is the outside of the vehicle, and one side of the second transparent plate 113 facing away from the first transparent plate 111 is the inside of the vehicle. In other words, in this implementation, the light-guiding assembly 12 and the light source 21 are disposed on the inside of the vehicle.

The intermediate layer 112 is adhesive, and the intermediate layer 112 is configured to bond the first transparent plate 111 and the second transparent plate 113. As illustrated in FIG. 2, when the through-hole 115 is defined at the second transparent plate 113, at least part of the intermediate layer 112 is retained at the through-hole 115, such that when the light-guiding member 121 abuts against the intermediate layer 112, the light-guiding member 121 is bonded to the intermediate layer 112 to form an integrated structure with a certain strength. Meanwhile, the light-guiding member 121 abuts against the second transparent plate 113, which further improves the strength of the light-guiding member 121 and the vehicle window glass 11 at the through-hole 115.

Specifically, the light-emitting surface 211 of the light source 21 refers to a surface of the light source 21 mainly through which light is emitted after the light source 21 is illuminated. The light-inputting surface 1211 of the light-guiding member 121 refers to a surface of the light-guiding member 121 through which the light is received. The light-outputting surface 1212 of the light-guiding member 121 refers to a surface of the light-guiding member 121 through which the light received by the light-inputting surface 1211 of the light-guiding member 121 is emitted after the light is transmitted through the light-guiding member 121. It may be understood that the number of the light-inputting surface 1211 and the number of the light-outputting surface 1212 of the light-guiding member 121 will not be limited in the present disclosure.

The light-guiding member 121 is disposed as long as the light-outputting surface 1212 of the light-guiding member 121 is disposed facing towards the inner sidewall of the through-hole 115, and in this way the light emitted by the light source 21 can be incident to the light-sensitive member 114 via the light-guiding member 121, thereby preventing the light source 21 from being disposed in the through-hole 115 and affecting the structural strength of the vehicle window glass 11 at the through-hole 115.

Figure 3:
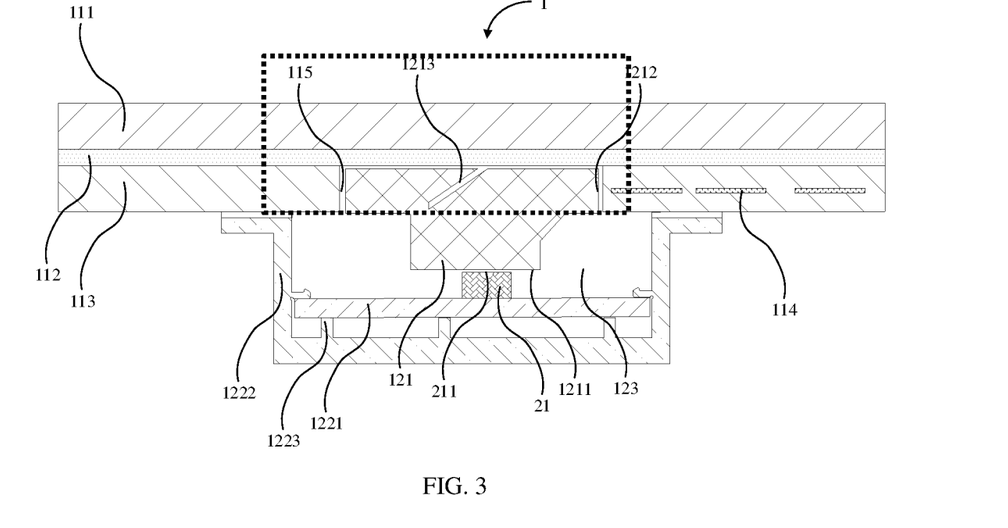
FIG. 3 is a schematic cross-sectional view of a vehicle window assembly provided in an implementation of the present disclosure.
Figure 4:
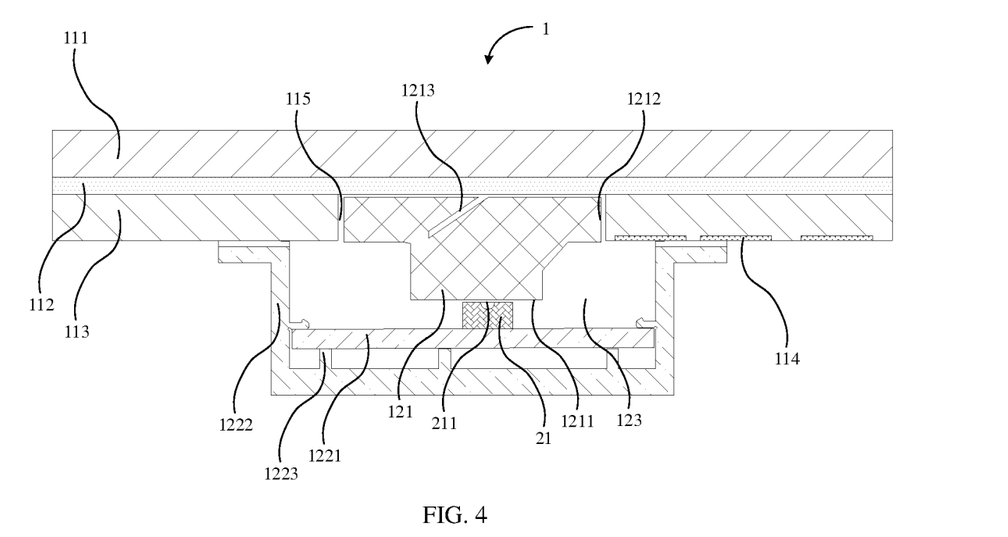
FIG. 4 is a schematic cross-sectional view of a vehicle window assembly provided in an implementation of the present disclosure.

It may be noted that in this implementation, the light-sensitive member 114 is disposed on a surface of the second transparent plate 113 close to the first transparent plate 111 in a stacking direction. It may be understood that in other possible implementations, the light-sensitive member 114 can also be disposed at other positions in the vehicle window glass 11. For example, reference can be made to FIG. 3 and FIG. 4 together, where FIG. 3 is a schematic cross-sectional view of a vehicle window assembly provided in an implementation of the present disclosure, and FIG. 4 is a schematic cross-sectional view of a vehicle window assembly provided in an implementation of the present disclosure. As illustrated in FIG. 3, the light-sensitive member 114 is disposed inside the second transparent plate 113. Alternatively, as illustrated in FIG. 4, the light-sensitive member 114 is disposed on the surface of the second transparent plate 113 facing away from the first transparent plate 111 in the stacking direction, which will not be limited in the present disclosure.

It may be understood that when the light-sensitive member 114 is disposed in or on a surface of the second transparent plate 113, the light emitted by the light source 21 may also be incident to the second transparent plate 113 via the light-guiding member 121. In other words, in this implementation, the second transparent plate 113 also functions as a light-guiding layer, such that the light may be transmitted through the second transparent plate 113 and may finally be incident to the light-sensitive member 114.

Specifically, after the light emitted by the light source 21 is incident to the light-sensitive member 114 via the light-guiding member 121, the light-sensitive member 114 may reflect the light into the vehicle, or refract the light into the vehicle. When the light-sensitive member 114 is a photoluminescence member, the light-sensitive member 114 can emit the light into the vehicle after being excited by the light emitted by the light source 21. It may be understood that the type of the light-sensitive member 114 will not be limited in the present disclosure.

It may be understood that in this implementation, the light-guiding member 121 is disposed correspondingly in the through-hole 115, and the light-guiding member 121 at least partially abuts against the intermediate layer 112 and the second transparent plate 113, such that the light-guiding member 121 and the vehicle window glass 11 may support each other at the through-hole 115 and have a certain support strength at the through-hole 115, thereby avoiding affecting the safety of vehicle driving.

Reference can be to FIG. 2 again, in a possible implementation, the fixing member 122 includes a base plate 1221, a housing 1222, and at least one reinforcing rib 1223, the light source 21 is fixedly disposed on the base plate 1221, and the base plate 1221 is fixedly connected to an inner sidewall of the housing 1222 via the at least one reinforcing rib 1223.

Specifically, both ends of the housing 1222 are respectively fixedly connected to the surface of the second transparent plate 113 facing away from the first transparent plate 111. It may be understood that a fixing connection manner between the housing 1222 and the second transparent plate 113 will not be limited in the present disclosure. In this implementation, the at least one reinforcing rib 1223 has strong connection strength, and the base plate 1221 is fixedly connected to the inner sidewall of the housing 1222 via the at least one reinforcing rib 1223, such that the overall structural strength of the fixing member 122 may be stronger.

In this implementation, the housing 1222 is further provided with a snap-fit member 1224, and the snap-fit member 1224 is configured to snap the base plate 1221 to a corresponding position. The base plate 1221 is disposed parallel to the light-inputting surface 1211 of the light-guiding member 121, and the light source 21 is fixedly disposed on the base plate 1221, such that the light-emitting surface 211 of the light source 21 is disposed facing towards the light-inputting surface 1211 of the light-guiding member 121.

Reference can be to FIG. 2 again, in a possible implementation, the light-guiding member 121 includes an optical sub-member 1213. The optical sub-member 1213 is configured to refract the light emitted by the light source 21 to emit the light from the light-outputting surface 1212 of the light-guiding member 121.

Specifically, two surfaces of the optical sub-member 1213 are configured to refract light. When the light is incident to the two surfaces of the optical sub-member 1213, all the light is refracted and emitted from the optical sub-member 1213. In this implementation, the light emitted by the light source 21 is incident to the light-guiding member 121 via the light-inputting surface 1211 of the light-guiding member 121 and then incident to the optical sub-member 1213. The light incident to the optical sub-member 1213 is then refracted by the optical sub-member 1213 and finally emitted from the light-outputting surface 1212 of the light-guiding member 121.

It may be understood that in other possible implementations, an optical member such as a reflector positioned at a certain angle with the light-inputting surface 1211 of the light-guiding member 121 may also be disposed in the light-guiding member 121, such that the light incident from the light-inputting surface 1211 of the light-guiding member 121 can be emitted from the light-outputting surface 1212 of the light-guiding member 121, which will not be limited in the present disclosure.

In a possible implementation, an angle between the light-outputting surface 1212 of the light-guiding member 121 and the light-inputting surface 1211 of the light-guiding member 121 ranges from 0° to 90°.

In this implementation, the light-outputting surface 1212 of the light-guiding member 121 and the light-inputting surface 1211 of the light-guiding member 121 are disposed perpendicular to each other. It may be understood that, when the light-outputting surface 1212 of the light-guiding member 121 is disposed facing towards the inner sidewall of the through-hole 115, more light emitted from the light-outputting surface 1212 of the light-guiding member 121 can be incident to the light-sensitive member 114. Specifically, the base plate 1221 is perpendicular or approximately perpendicular to the inner sidewall of the through-hole 115, and the light-inputting surface 1211 of the light-guiding member 121 is approximately parallel to the base plate 1221. Therefore, the light-outputting surface 1212 of the light-guiding member 121 and the light-inputting surface 1211 of the light-guiding member 121 are disposed perpendicular or approximately perpendicular to each other.

Figure 5:
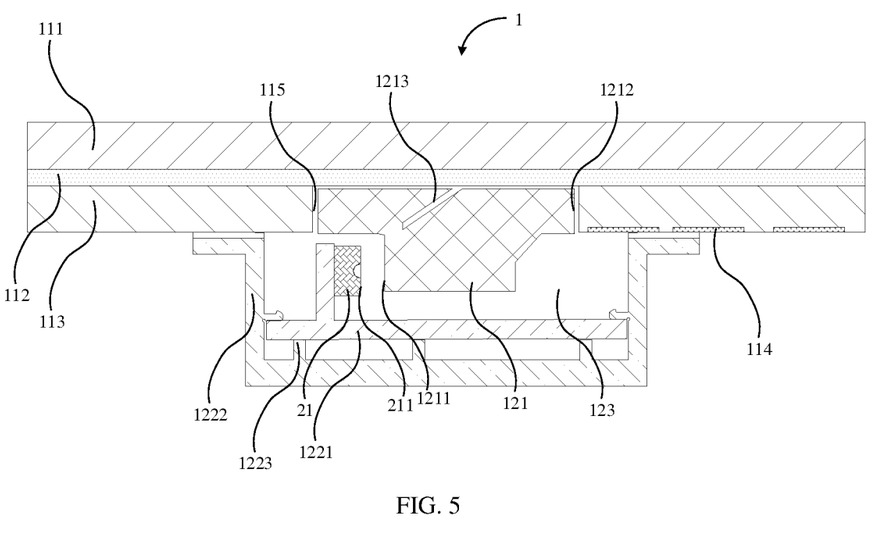
FIG. 5 is a schematic cross-sectional view of a vehicle window assembly provided in another implementation of the present disclosure

Reference can be made to FIG. 5 together, where FIG. 5 is a schematic cross-sectional view of a vehicle window assembly provided in another implementation of the present disclosure. It may be understood that in other possible implementations, the light-inputting surface 1211 of the light-guiding member 121 and the light-outputting surface 1212 of the light-guiding member 121 may also be disposed at an angle or disposed in parallel, as long as the light emitted from the light-outputting surface 1212 of the light-guiding member 121 can be incident to the light-sensitive member 114, which will not be limited in the present disclosure.

In a possible implementation, the light-guiding member 121 is provided with a reflective substance 118 on at least part of an inner sidewall of the light-guiding member 121, and the reflective substance 118 is configured to reflect light.

Specifically, after the light emitted by the light source 21 is incident to the light-guiding member 121 from the light-inputting surface 1211 of the light-guiding member 121, not all of the light can be directly emitted from the light-outputting surface 1212 of the light-guiding member 121, and transmission direction of some of the light may be changed. It may be understood that in this implementation, in order to utilize the light more efficiently, the light-guiding member 121 is provided with the reflective substance 118 on the at least part of the inner sidewall of the light-guiding member 121. In this way, the light not emitted from the light-outputting surface 1212 of the light-guiding member 121 can be reflected multiple times within the light-guiding member 121. Finally, transmission direction of the light is changed by refraction/reflection of the optical sub-member 1213 or other optical members, and the light may be emitted from the light-outputting surface 1212 of the light-guiding member 121.

It may be understood that in other possible implementations, optical members that can collect and collimate light can further be addtionally disposed behind the light-inputting surface 1211 of the light-guiding member 121, such that the light can be incident at a better angle to the optical sub-member 1213 or other optical members that may change the transmission direction of the light, which will not be limited in the present disclosure.

In a possible implementation, reflectivity of a surface of the light-guiding member 121 close to and facing towards the intermediate layer 112 is greater than or equal to a reflection threshold.

Specifically, the reflectivity of the surface of the light-guiding member 121 close to and facing towards the intermediate layer 112 is greater than or equal to the reflection threshold. In other words, most of the light incident to the surface of the light-guiding member 121 close to and facing towards the intermediate layer 112 can be reflected back into the light-guiding member 121, and the amount of reflected light depends on the reflection threshold. It may be understood that the reflection threshold is determined by a material of the surface of the light-guiding member 121 close to and facing towards the intermediate layer 112. In this implementation, the reflection threshold may be 99%, 97%, 96%, or the like. The material of the light-guiding member 121 can be changed according to an actual situation, such that the reflection threshold can be changed, which will not be limited in the present disclosure.

It may be understood that in this implementation, on one hand, utilization rate of the light inside the light-guiding member 121 can be further improved in this manner. On the other hand, the light can be prevented from emitting from the surface of the light-guiding member 121 close to and facing towards the intermediate layer 112 in this manner. In other words, the light can be prevented from emitting to the outside of the vehicle through the intermediate layer 112 and the first transparent plate 111, thereby preventing structures such as the light-guiding assembly 12 inside the vehicle window glass 11 from being viewed from the outside of the vehicle, and improving overall aesthetics.

Figure 6:
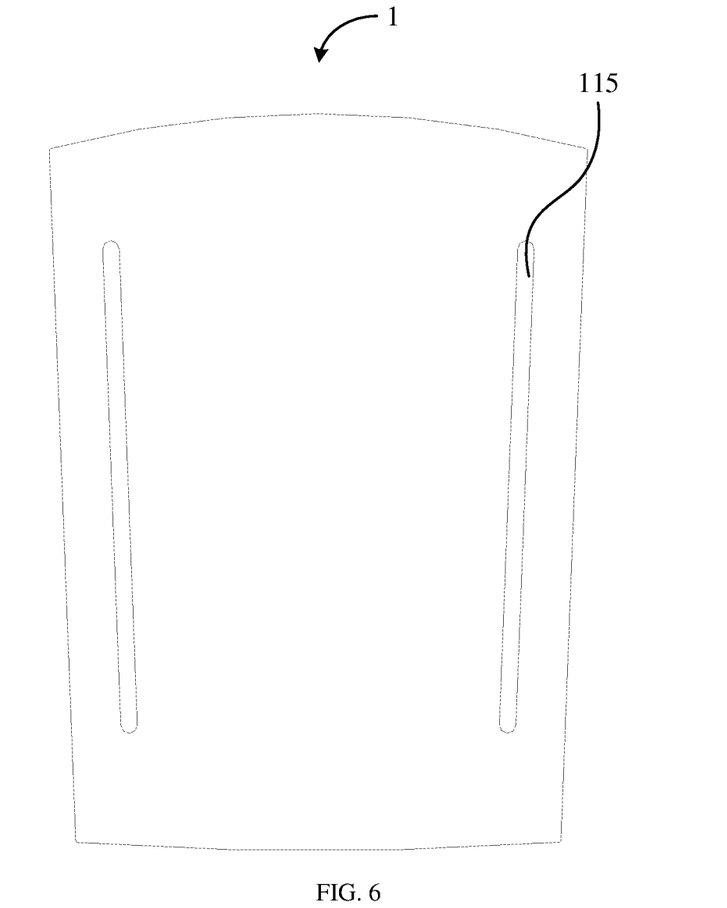
FIG. 6 is a schematic top view of a vehicle window assembly provided in another implementation of the present disclosure.
Figure 7:
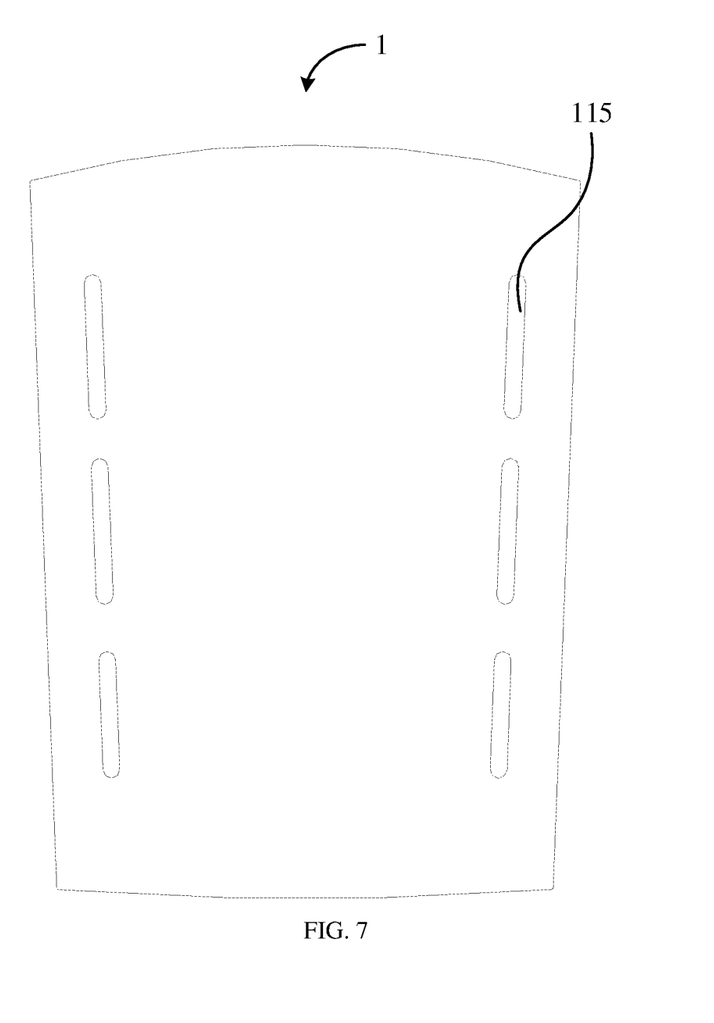
FIG. 7 is a schematic top view of a vehicle window assembly provided in another implementation of the present disclosure.
Figure 8:
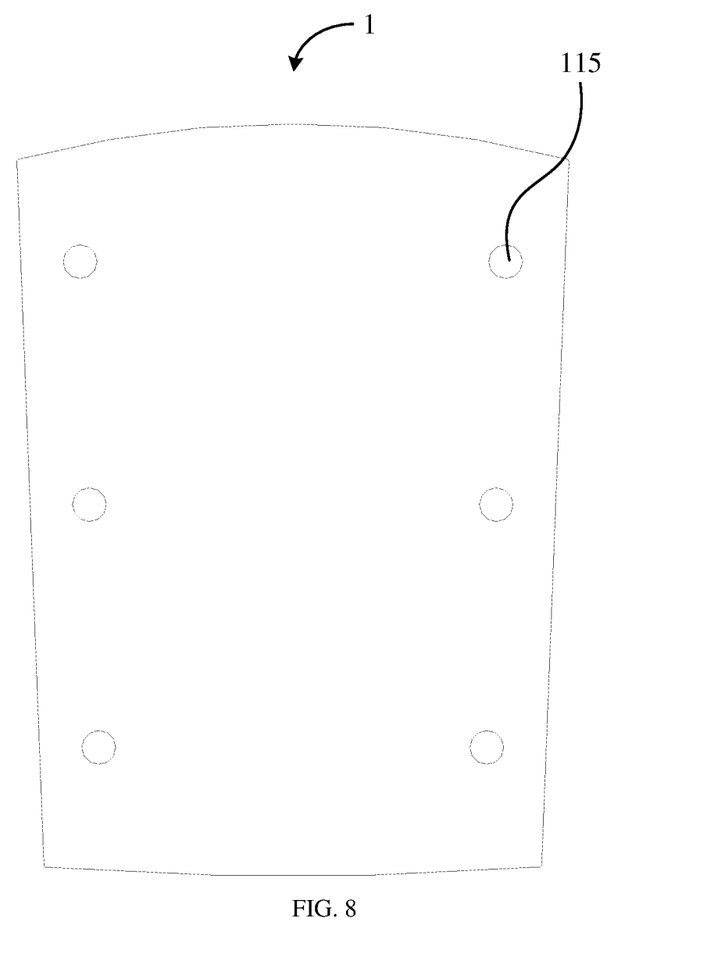
FIG. 8 is a schematic top view of a vehicle window assembly provided in another implementation of the present disclosure.

Reference can be made to FIG. 6 to FIG. 8 together, where FIG. 6 is a schematic top view of a vehicle window assembly provided in another implementation of the present disclosure, FIG. 7 is a schematic top view of a vehicle window assembly provided in another implementation of the present disclosure, and FIG. 8 is a schematic top view of a vehicle window assembly provided in another implementation of the present disclosure. In a possible implementation, a shape of the through-hole 115 is one or more of a rectangle, an ellipse, a circle, or any polygon.

It may be noted that, in order to observe the shape of the through-hole 115 more clearly and intuitively, the through-hole 115 is illustrated in perspective in FIG. 6. The shape of the through-hole 115 refers to a contour of the through-hole 115 in a top view of the vehicle window assembly 1. It may be understood that the shape of the through-hole 115 may also be changed according to different positions of the light-sensitive member 114 disposed in the vehicle window glass 11, such that the light can be incident to the light-sensitive member 114 through the inner sidewall of the through-hole 115.

Specifically, the light-guiding assembly 12 is disposed according to the position of the through-hole 115. It may be understood that the through-hole 115 may be disposed continuously as illustrated in FIG. 6 or may also be spaced apart from each other as illustrated in FIG. 7 or FIG. 8, which will not be limited in the present disclosure.

Reference can be made to FIG. 8 again, in a possible implementation, when the shape of the through-hole 115 is a circle, a diameter of the through-hole 115 is less than or equal to 50 mm.

It may be understood that the through-hole 115 with a larger diameter may damage a structure of the vehicle window glass 11. Therefore, in this implementation, the diameter of the through-hole 115 is less than or equal to 50 mm. When the through-hole 115 is in a shape as illustrated in FIG. 6 or FIG. 7, a minor axis of the through-hole 115 may be less than or equal to 50 mm.

Preferably, the diameter of the through-hole 115 may also be less than or equal to 40 mm. Specifically, the diameter of the through-hole 115 may also be 38 mm, 35 mm, 26 mm, 21 mm, or the like, which will not be limited in the present disclosure.

In a possible implementation, a shape of the light-guiding member 121 disposed in the through-hole 115 matches the shape of the through-hole 115.

Specifically, the shape of the light-guiding member 121 disposed in the through-hole 115 matches the shape of the through-hole 115, which means that a contour of the light-guiding member 121 is substantially the same as a contour of the through-hole 115. It may be understood that in this implementation, on one hand, the light-outputting surface 1212 of the light-guiding member 121 can be disposed facing towards the inner sidewall of the through-hole 115 to a great extent in this manner, thereby improving the utilization rate of the light. On the other hand, matching shapes can prevent the light-guiding member 121 from colliding with the inner sidewall of the through-hole 115 in this manner, thereby protecting the light-guiding member 121 and the vehicle window glass 11 to some extent.

Figure 9:
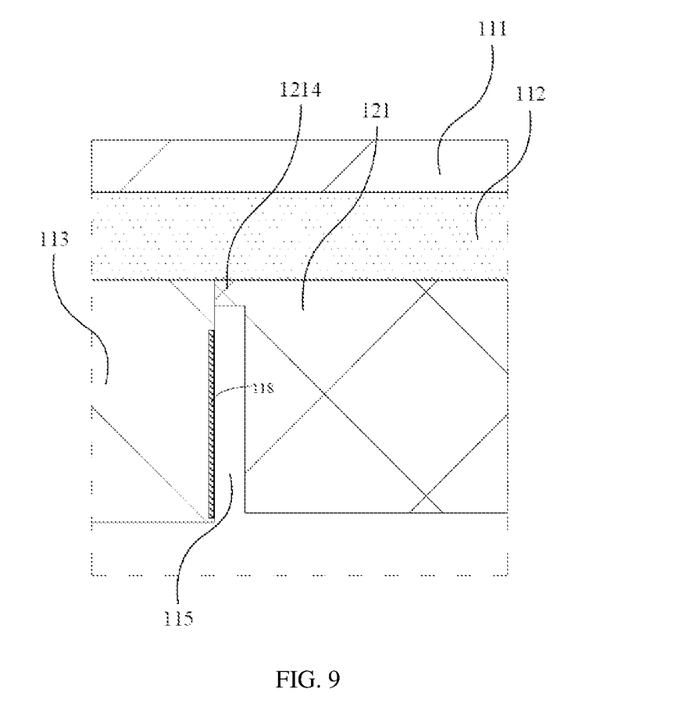
FIG. 9 is a partially enlarged schematic view of a dashed box in FIG. 2.

Reference can be made to FIG. 9 together, where FIG. 9 is a partially enlarged schematic view of a dashed box in FIG. 2. In a possible implementation, the light-guiding member 121 includes a supporting portion 1214, and the supporting portion 1214 abuts against the inner wall of the through-hole 115.

In this implementation, the supporting portion 1214 is disposed on one side of the light-guiding member 121 close to the intermediate layer 112. The supporting portion 1214 abuts against the inner sidewall of the through-hole 115, such that the light-guiding member 121 and the vehicle window glass 11 may be subjected to a uniform force at the through-hole 115, thereby further improving strength of the vehicle window glass 11 at the through-hole 115 to some extent.

In other possible implementations, the supporting portion 1214 can also be disposed at other positions of the light-guiding member 121 as long as the strength of the vehicle window glass 11 at the through-hole 115 is not affected, which will not be limited in the present disclosure.

Figure 10:
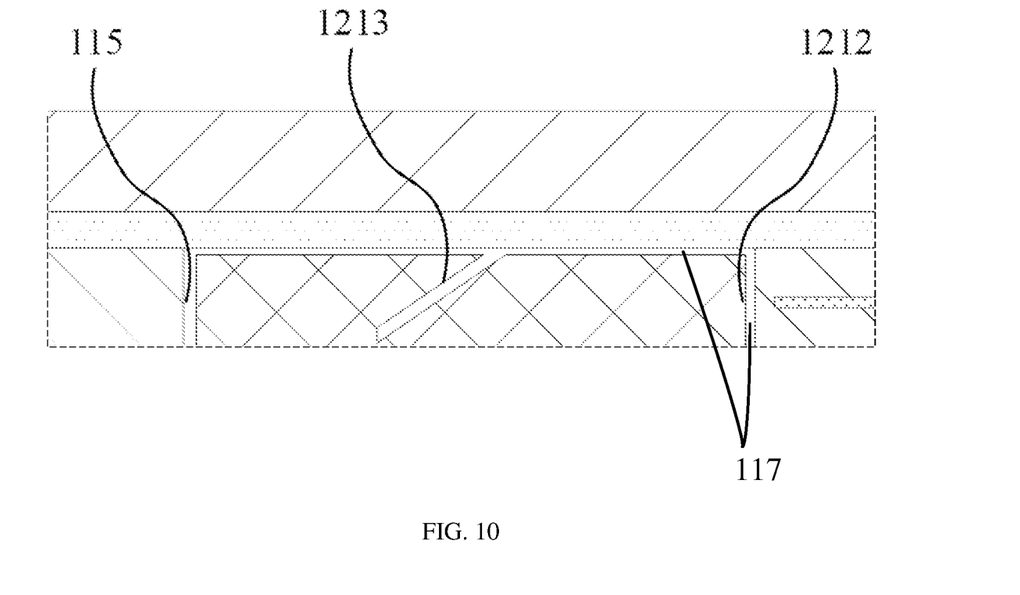
FIG. 10 is a partially enlarged schematic view of a dashed box in FIG. 3.

Reference can be made to FIG. 10 together, where FIG. 10 is a partially enlarged schematic view of a dashed box in FIG. 3. In a possible implementation, the light-guiding member 121 disposed in the through-hole 115 and the inner sidewall of the through-hole 115 define a gap 117, and the gap 117 is less than or equal to 2 mm.

Specifically, for ease of installation, the light-guiding member 121 disposed in the through-hole 115 and the inner sidewall of the through-hole 115 define a gap. It may be understood that a larger gap may cause part of the light emitted from the light-outputting surface 1212 of the light-guiding member 121 not to be incident to the light-sensitive member 114. Therefore, in this implementation, the gap is less than or equal to 2 mm. Preferably, the gap can also be less than or equal to 1.5 mm. Specifically, the gap can also be 1.3 mm, 1.1 mm, 0.7 mm, 0.5 mm, or the like, which will not be limited in the present disclosure.

In a possible implementation, an extension length of the light-outputting surface 1212 of the light-guiding member 121 extending beyond the through-hole 115 is less than or equal to 5 mm.

Specifically, the extension length of the light-outputting surface 1212 of the light-guiding member 121 extending beyond the through-hole 115 refers to a height of one end of the light-outputting surface 1212 of the light-guiding member 121 away from the intermediate layer 112 from the surface of the second transparent plate 113 away from the intermediate layer 112.

In this implementation, in order to ensure utilization efficiency of the light, the extension length of the light-outputting surface 1212 of the light-guiding member 121 extending beyond the through-hole 115 is less than or equal to 5 mm. Preferably, the extension length of the light-outputting surface 1212 of the light-guiding member 121 extending beyond the through-hole 115 can also be less than or equal to 3 mm. Specifically, the extension length of the light-outputting surface 1212 of the light-guiding member 121 extending beyond the through-hole 115 can also be 2.8 mm, 2.4 mm, 1.0 mm, 0.5 mm, or the like, which will not be limited in the present disclosure.

In a possible implementation, the through-hole 115 extends through two opposite surfaces of the second transparent plate 113 in the stacking direction.

Specifically, in this implementation, the light-guiding member 121 is bonded to the intermediate layer 112. It may be understood that in other possible implementations, the second transparent plate 113 defines a blind hole, and the blind hole does not extend through the two opposite surfaces of the second transparent plate 113 in the stacking direction. Instead, the blind hole is equivalent to a fixing groove with a certain depth, and the light-guiding member 121 is fixedly disposed in the blind hole, which will not be limited in the present disclosure.

In a possible implementation, the through-hole 115 is provided with the reflective substance 118 on at least part of the inner sidewall of the through-hole 115, and the reflective substance is configured to reflect light.

It may be noted that not all of the inner wall of the through-hole 115 is configured to receive light. Therefore, in this implementation, in order to further improve the utilization rate of the light, the through-hole 115 is provided with the reflective substance 118 on the at least part of the inner sidewall of the through-hole 115 to reflect the light to the light-guiding member 121 or the light-sensitive member 114.

Figure 11:
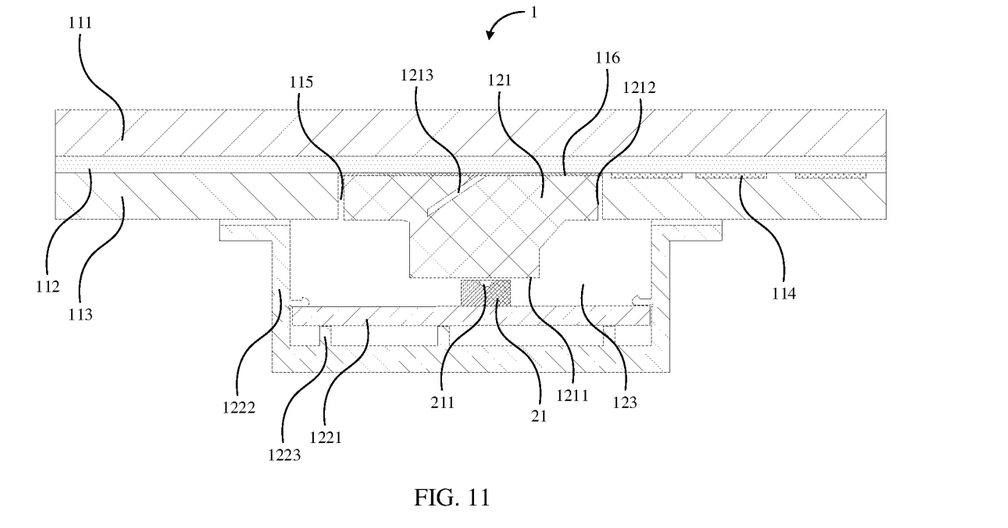
FIG. 11 is a schematic cross-sectional view of a vehicle window assembly provided in another implementation of the present disclosure.

Reference can be made to FIG. 10 together, where FIG. 10 is a schematic cross-sectional view of a vehicle window assembly provided in another implementation of the present disclosure. In a possible implementation, the vehicle window glass 11 further includes a reflective layer 116, the reflective layer 116 is disposed on a surface of the intermediate layer 112 close to the second transparent plate 113, and the reflective layer 116 is disposed corresponding to the through-hole 115.

Specifically, most of the light incident to the reflective layer 116 from the inside of the light-guiding member 121 can be reflected back into the inside of the light-guiding member 121 in this manner. It may be understood that in this implementation, on one hand, the utilization rate of the light inside the light-guiding member 121 can be further improved in this manner. On the other hand, the light can be prevented from emitting from the surface of the light-guiding member 121 close to and facing towards the intermediate layer 112 in this manner. In other words, the light can be prevented from emitting to the outside of the vehicle through the intermediate layer 112 and the first transparent plate 111, thereby preventing structures such as the light-guiding assembly 12 inside the vehicle window glass 11 from being viewed from the outside of the vehicle, and improving the overall aesthetics.

Figure 12:
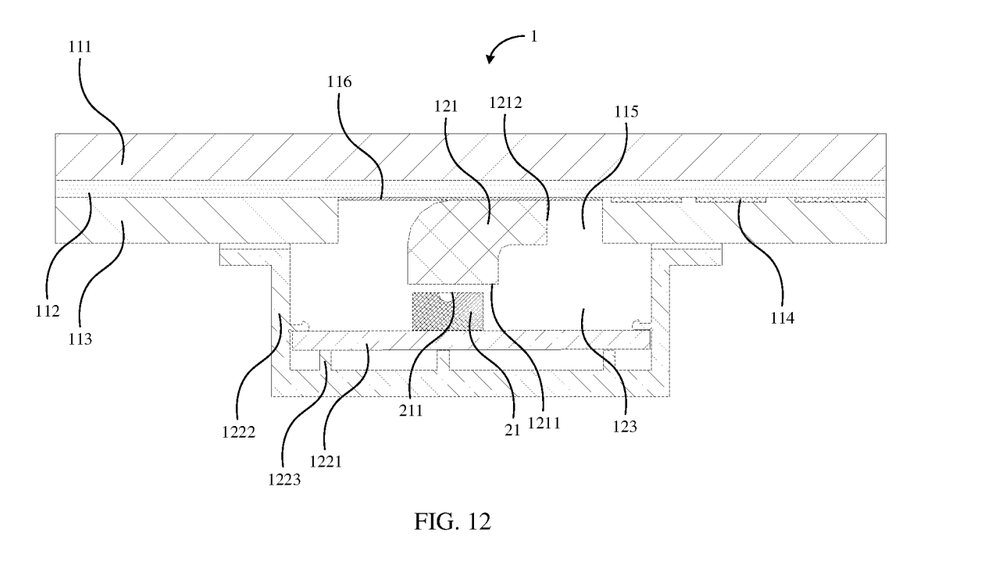
FIG. 12 is a schematic cross-sectional view of a vehicle window assembly provided in another implementation of the present disclosure.

Reference can be made to FIG. 12 together, where FIG. 12 is a schematic cross-sectional view of a vehicle window assembly provided in another implementation of the present disclosure. Specifically, as illustrated in FIG. 12, in a possible implementation, the light-guiding member 121 is of an L-shaped structure. It may be understood that in other possible implementations, the shape of the light-guiding member 121 may also be other shapes, which will not be limited in the present disclosure.

Figure 13:
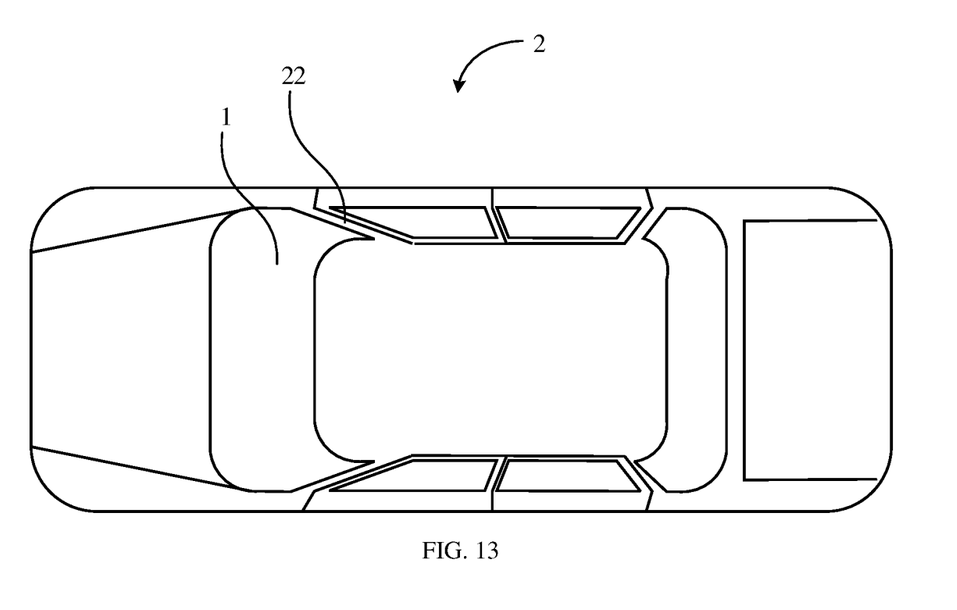
FIG. 13 is a schematic top view of a vehicle provided in an implementation of the present disclosure.

A vehicle 2 is further provided in the present disclosure. Reference can be made to FIG. 13 together, where FIG. 13 is a schematic top view of a vehicle provided in an implementation of the present disclosure. The vehicle 2 includes the vehicle window assembly 1 mentioned above and a vehicle frame 22, and the vehicle window assembly 1 is mounted on the vehicle frame 22. Specifically, for the vehicle window assembly 1, reference can be made to the above descriptions, which will not be repeated herein.

Principles and implementations of the present disclosure are elaborated with specific implementations herein. The illustration of the implementations above is only used to help understand core ideas of the disclosure. Meanwhile, for those of ordinary skill in the art, according to ideas of the present disclosure, there will be changes in the specific implementations and application scopes. In summary, contents of this specification may not be understood as a limitation on the present disclosure.

What is claimed is:

1. A vehicle window assembly, comprising a vehicle window glass and a light-guiding assembly, wherein the vehicle window glass comprises a first transparent plate, an intermediate layer, and a second transparent plate that are stacked successively, the first transparent plate is connected to the second transparent plate via the intermediate layer, and the second transparent plate defines a through-hole; the light-guiding assembly comprises a light-guiding member and a fixing member, the light-guiding member is at least partially disposed in the through-hole and fills the through-hole, and a light-outputting surface of the light-guiding member is disposed facing towards an inner sidewall of the through-hole; the fixing member is disposed on a surface of the second transparent plate facing away from the first transparent plate, and the fixing member and the second transparent plate define an accommodating space configured to accommodate a light source; a light-emitting surface of the light source is disposed facing towards a light-inputting surface of the light-guiding member; the vehicle window glass further comprises a light-sensitive member, the light-sensitive member is disposed corresponding to the light-outputting surface of the light-guiding member, to make light emitted by the light source incident to the light-sensitive member via the light-guiding member, and the light-sensitive member is configured to transmit the light into a vehicle;

wherein a surface of the light-guiding member close to the intermediate layer is entirely parallel to a surface of the intermediate layer close to the light-guiding member.

2. The vehicle window assembly of claim 1, wherein the fixing member comprises a base plate, a housing, and at least one reinforcing rib, the light source is fixedly disposed on the base plate, and the base plate is fixedly connected to an inner sidewall of the housing via the at least one reinforcing rib.

3. The vehicle window assembly of claim 1, wherein the light-guiding member comprises an optical sub-member, and the optical sub-member is configured to refract the light emitted by the light source to emit the light from the light-outputting surface of the light-guiding member.

4. The vehicle window assembly of claim 3, wherein an angle between the light-outputting surface of the light-guiding member and the light-inputting surface of the light-guiding member ranges from 0° to 90°.

5. The vehicle window assembly of claim 3, wherein the light-guiding member is provided with a reflective substance on at least part of an inner sidewall of the light-guiding member, and the reflective substance is configured to reflect light.

6. The vehicle window assembly of claim 3, wherein reflectivity of a surface of the light-guiding member close to and facing towards the intermediate layer is greater than or equal to a reflection threshold.

7. The vehicle window assembly of claim 1, wherein a shape of the through-hole is one or more of a rectangle, an ellipse, a circle, or any polygon.

8. The vehicle window assembly of claim 7, wherein when the shape of the through-hole is a circle, a diameter of the through-hole is less than or equal to 50 mm.

9. The vehicle window assembly of claim 7, wherein a shape of the light-guiding member disposed in the through-hole matches the shape of the through-hole.

10. The vehicle window assembly of claim 1, wherein the light-guiding member comprises a supporting portion, and the supporting portion abuts against the inner sidewall of the through-hole.

11. The vehicle window assembly of claim 1, wherein the light-guiding member disposed in the through-hole and the inner sidewall of the through-hole define a gap, and the gap is less than or equal to 2 mm.

12. The vehicle window assembly of claim 1, wherein an extension length of the light-outputting surface of the light-guiding member extending beyond the through-hole is less than or equal to 5 mm.

13. The vehicle window assembly of claim 1, wherein the through-hole is provided with a reflective substance on at least part of an inner sidewall of the through-hole, and the reflective substance is configured to reflect light.

14. The vehicle window assembly of claim 1, wherein the vehicle window glass further comprises a reflective layer, the reflective layer is disposed on a surface of the intermediate layer close to the second transparent plate, and the reflective layer is disposed corresponding to the through-hole.

15. A vehicle, comprising a vehicle window assembly and a vehicle frame, wherein the vehicle window assembly is mounted on the vehicle frame; wherein the vehicle window assembly comprises a vehicle window glass and a light-guiding assembly, wherein the vehicle window glass comprises a first transparent plate, an intermediate layer, and a second transparent plate that are stacked successively, the first transparent plate is connected to the second transparent plate via the intermediate layer, and the second transparent plate defines a through-hole; the light-guiding assembly comprises a light-guiding member and a fixing member, the light-guiding member is at least partially disposed in the through-hole and fills the through-hole, and a light-outputting surface of the light-guiding member is disposed facing towards an inner sidewall of the through-hole; the fixing member is disposed on a surface of the second transparent plate facing away from the first transparent plate, and the fixing member and the second transparent plate define an accommodating space configured to accommodate a light source; a light-emitting surface of the light source is disposed facing towards a light-inputting surface of the light-guiding member; the vehicle window glass further comprises a light-sensitive member, the light-sensitive member is disposed corresponding to the light-outputting surface of the light-guiding member, to make light emitted by the light source incident to the light-sensitive member via the light-guiding member, and the light-sensitive member is configured to transmit the light into a vehicle;

wherein a surface of the light-guiding member close to the intermediate layer is entirely parallel to a surface of the intermediate layer close to the light-guiding member.

16. The vehicle of claim 15, wherein the fixing member comprises a base plate, a housing, and at least one reinforcing rib, the light source is fixedly disposed on the base plate, and the base plate is fixedly connected to an inner sidewall of the housing via the at least one reinforcing rib.

17. The vehicle of claim 15, wherein the light-guiding member comprises an optical sub-member, and the optical sub-member is configured to refract the light emitted by the light source to emit the light from the light-outputting surface of the light-guiding member.

18. The vehicle of claim 17, wherein the light-guiding member is provided with a reflective substance on at least part of an inner sidewall of the light-guiding member, and the reflective substance is configured to reflect light.

19. The vehicle of claim 17, wherein reflectivity of a surface of the light-guiding member close to and facing towards the intermediate layer is greater than or equal to a reflection threshold.

20. The vehicle of claim 15, wherein the light-guiding member disposed in the through-hole and an inner sidewall of the through-hole define a gap, and the gap is less than or equal to 2 mm.

* * * * *